United States Patent [19]
Tran et al.

[11] Patent Number: 5,457,460
[45] Date of Patent: Oct. 10, 1995

[54] EMBEDDED THREAT DATA RECORDER

[75] Inventors: My Tran; John E. Rasinski; Mark R. Milden, all of Albuquerque, N.M.

[73] Assignee: Honeywell Inc., Minneapolis, Minn.

[21] Appl. No.: 977,335

[22] Filed: Nov. 17, 1992

[51] Int. Cl.⁶ .............................. G01S 7/36; G01S 7/38; G01S 7/41; H04K 3/00
[52] U.S. Cl. .................. 342/13; 342/15; 342/16; 342/17
[58] Field of Search .................. 342/13, 14, 15, 342/16, 17, 18, 19, 20

[56] References Cited

U.S. PATENT DOCUMENTS

| H 433 | 2/1988 | Butler | 342/14 |
|---|---|---|---|
| H 513 | 8/1988 | Dunne et al. | 364/516 |
| 4,442,491 | 4/1984 | Olhausen, Jr. | 434/30 |
| 4,700,191 | 10/1987 | Manor | 342/13 |
| 4,729,737 | 3/1988 | Reagan et al. | 434/35 |
| 4,816,828 | 3/1989 | Feher | 340/945 |
| 5,063,385 | 11/1991 | Caschera | 342/13 |
| 5,117,360 | 5/1992 | Hotz et al. | 364/423 |
| 5,122,801 | 6/1992 | Hughes | 342/13 |
| 5,128,679 | 7/1992 | Moffat | 342/13 |
| 5,153,594 | 10/1992 | Moffat | 342/15 |
| 5,173,701 | 12/1992 | Dijkstra | 342/17 |
| 5,287,110 | 2/1994 | Tran | 342/13 |

*Primary Examiner*—John B. Sotomayor
*Attorney, Agent, or Firm*—Craig J. Lervick; Ronald E. Champion

[57] ABSTRACT

Aircraft survivability embedded data recorder for threat data. The embedded threat data recorder stores active threat data generated by aircraft survivability equipment sensors. Threat data from a radar warning receiver, a pulsed radar jammer, continuous wave radar jammer or missile approach detectors are recorded by the embedded threat data recorder. The threat data for each sensor is correlated between each sensor to ensure that redundant threats are eliminated. The threat data recorder represents the recorded threats on a display for mission briefing, evaluating countermeasure effectiveness, or identifying new threats. The embedded threat data recorder also provides downloading of threat data into a threat data transfer cartridge for use in off-line threat analysis. Data can be provided to other platforms, satellites and ground base stations. Data can be recorded on a multifunction display and data compression techniques may be used. The tape may also be played back in the aircraft.

21 Claims, 7 Drawing Sheets

EMBEDDED THREAT DATA RECORDER

UNITED STATES GOVERNMENT RIGHTS

The United States Government has acquired certain rights in this invention through government Contract No. DAA B07-87-C-H041 awarded by the Department of the Army.

RELATED APPLICATIONS

This application relates to co-pending applications Ser. Nos. 07/977,327, 07/977,328, 07/977,366 and 07/977,376, all filed Nov. 17, 1992 and all owned by the common assignee, Honeywell Inc.

BACKGROUND OF THE INVENTION

1. Field of the Invention

The invention relates to an aircraft survivability equipment (ASE) system and more particularly to an embedded threat data recorder for an ASE.

2. Discussion of the Prior Art

In the prior art, individual aircraft survivability equipment (ASE) sensors are used as stand-alone systems. The use of such systems in a stand-alone manner results in high pilot workloads. Further, in such systems only a limited amount of threat data is presented to the pilot. Data provided by various ASE subsystems such as pulsed radar jammers, CW radar jammers and missile approach detectors have previously not been used to provide a comprehensive and coherent picture of the threat environment. Thus prior art systems often do not record data in a coherent format to enable the quick and complete review of a given threat environment.

SUMMARY OF THE INVENTION

In contrast to the prior art, the present invention provides an embedded threat data recorder extensive for recording global and active threat data generated by Aircraft Survivability Equipment ASE sensors. Threat data from each sensor is correlated to ensure that threats are unique per time-line. A cross-correlation is performed between data generated by the radar warning receiver and the radar jammers to include the jamming status. Each threat is recorded as a record containing threat parameters as well as platform related data. Data can be represented on system display pages for mission debriefing, evaluating counter measures effectiveness, or identifying new threats. The present invention provides down-loading of threat data into a data transfer cartridge (DTC) for use in off-line threat analysis. From the off-line threat analysis, more comprehensive presentation of sensor effectiveness and new threat identification can be provided for evaluation.

Other objects, features and advantages of the present invention will become apparent to those skilled in the art through the description of the preferred embodiment, claims and drawings herein where like numerals refer to like elements.

DETAILED DESCRIPTION OF THE PREFERRED EMBODIMENT

Figure 1:
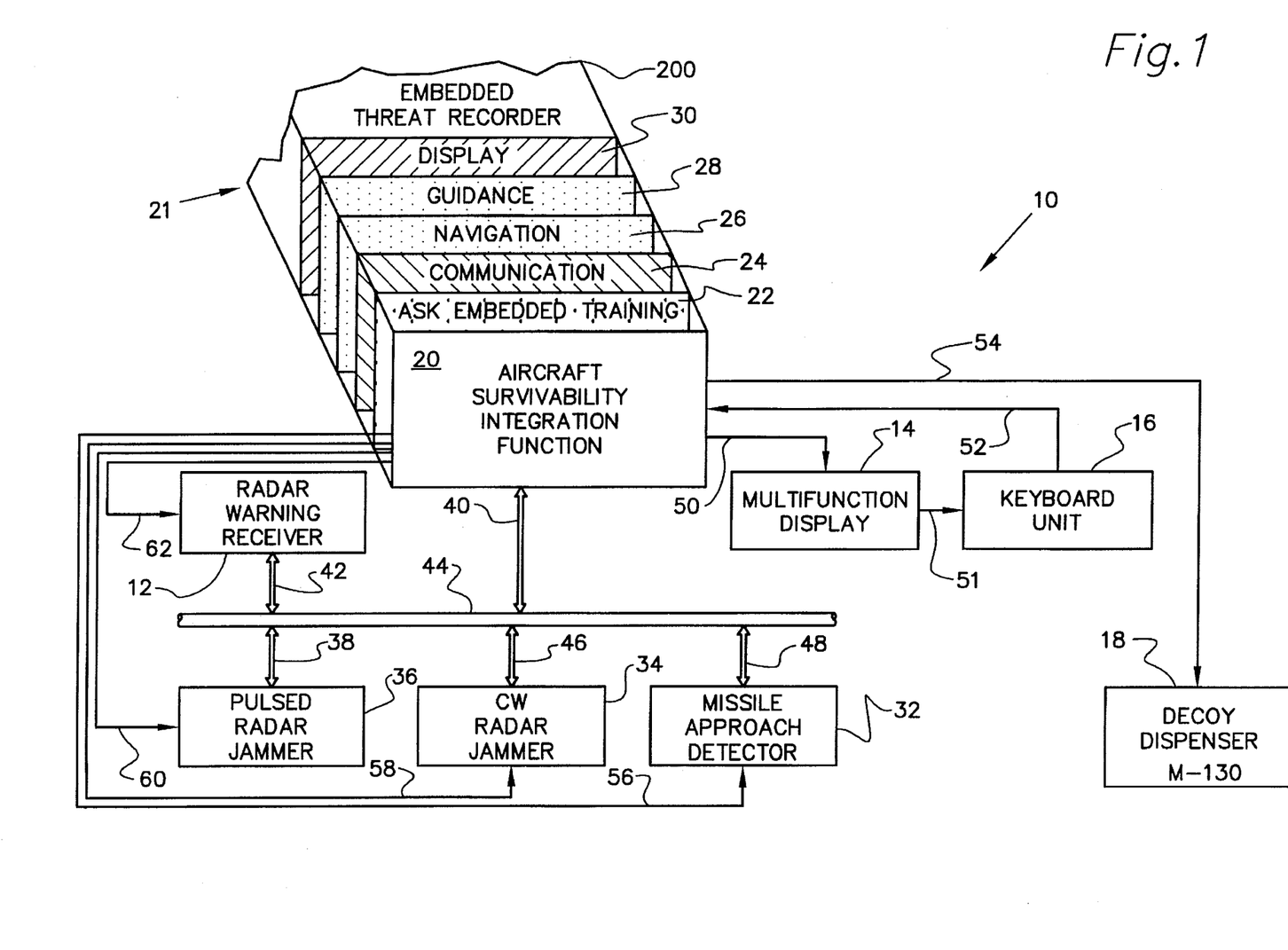
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a keyboard unit 16, a radar warning receiver 12, a pulsed radar jammer 36, a continuous wave (CW) radar jammer 34, a missile approach detector 32 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser jammer 36, CW radar jammer 34 and missile approach detector 32 all communicate with each other and the aircraft survivability integration functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, and the CW radar jammer 34 communicates to the data bus by communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver 12 may be wired by interface line 62 into the aircraft survivability integration function 20, the pulsed radar jammer by line 60, the CW radar jammer by line 58 and the missile approach detector by line 56. Hard wire and bus interfaces are typically provided with such ASE devices as are conventionally available.

The multifunction display 14 is controlled by the display apparatus 30 and is wired to the display apparatus 30 in aircraft survivability integration function 20 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integrated functions 21 to the decoy dispenser 18.

Figure 2:
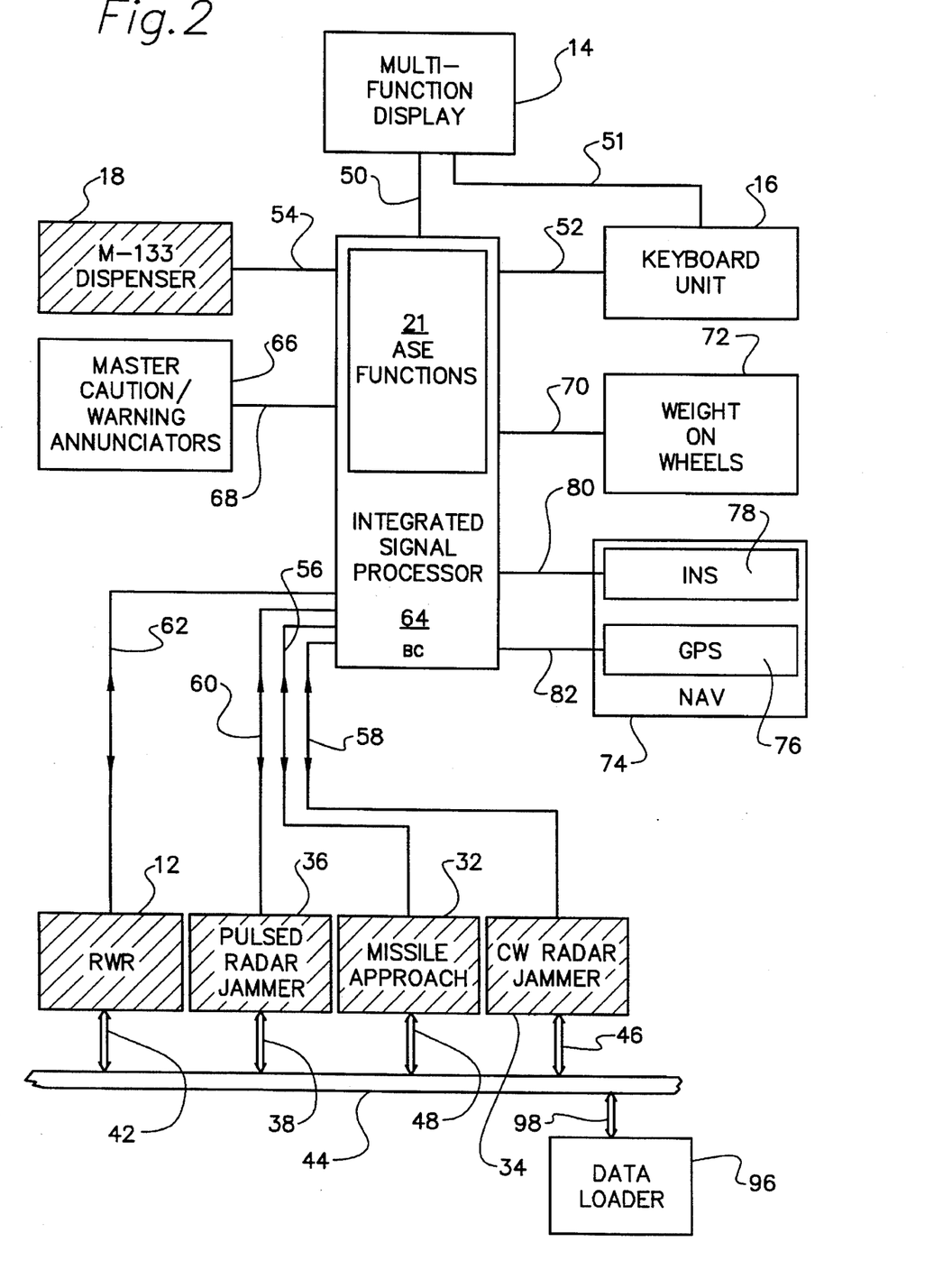
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/avionics control system (ASE/ACS). The aircraft survivability equipment/avionics control system is used to integrate control and display of an ASE suite of devices such as the radar warning detectors and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal on line 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when an appropriate signal is received from any one or more of the subsystem sensors, such as the radar warning receiver.

The embedded threat data recorder of the invention provides an extensive recording capability of all active threats generated by the following sensors: Radar Warning Receiver, Pulsed Radar Jammer's receiver, CW Radar Jammer's receiver, and Missile Approach Detector.

If the angle of arrival (AOA) is not available then incoming direction such as left, right or quadrant (1,2,3,4) is recorded.

A standard threat parameter list includes the following:
1. LIST—The sequence number of a threat record.
2. TIME—Initial time of threat detection or identification.
3. DUR—Duration of an active threat.
4. TYPE—Emitter identification.
5. MODE—Progressive radar weapon system mode.
6. AOA—Angle of arrival.
7. SOURCE—Source of providing threat data (RWR, PRJ, CWJ, MSL).
8. PRF—Pulse repetition frequency in range (min.-max.)
9. PRI—Pulse repetition interval in range (min.-max.).

The Platform data includes the following:
1. A/C Position—Aircraft position;
2. ALT—Aircraft altitude;
3. HDG—Heading (magnetic).

Figure 6:
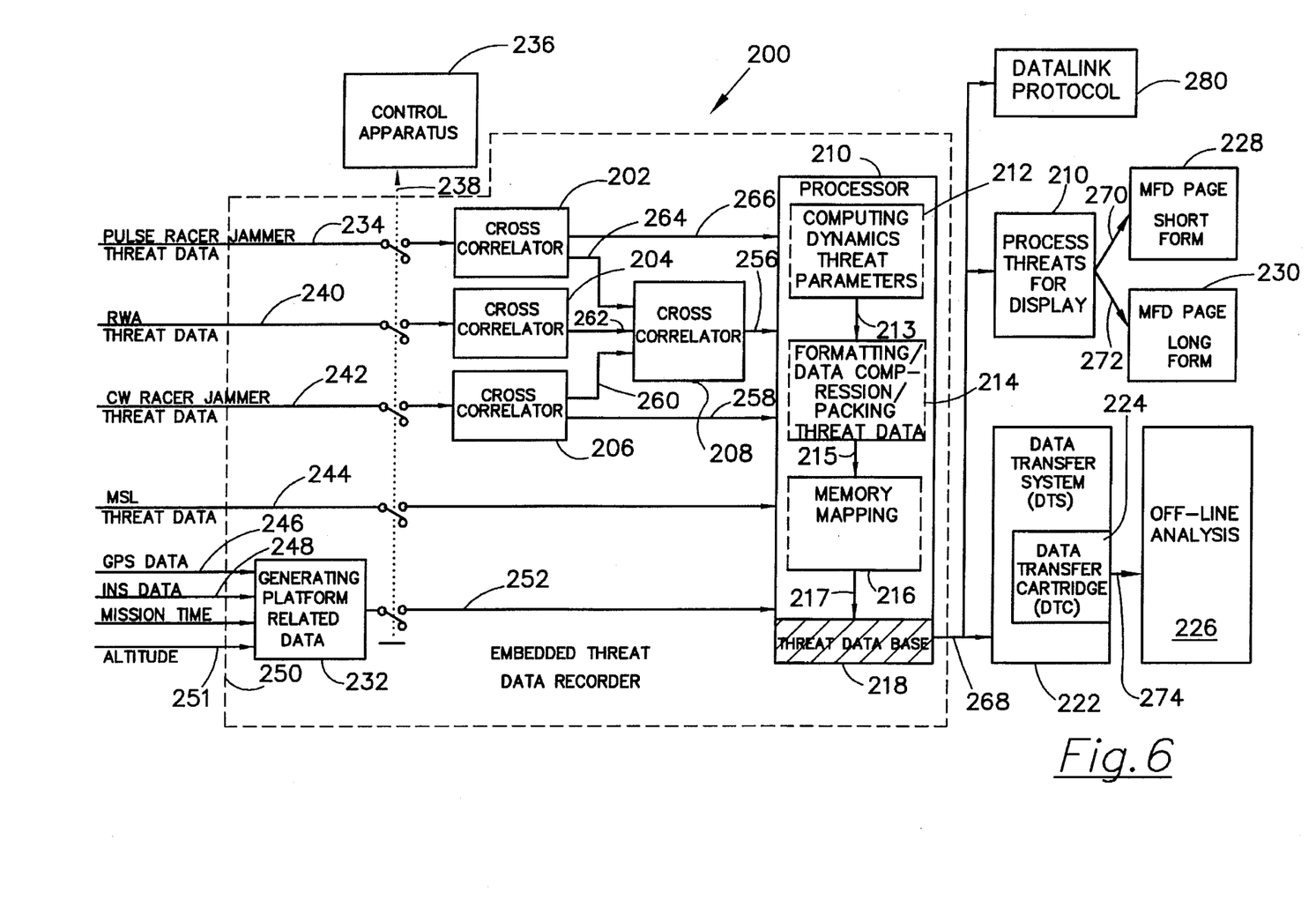
FIG. 6 shows a schematic block diagram of the embedded threat data recorder method of the invention integrated to a data transfer cartridge system and a threat display system.

Referring now to FIG. 6, a functional block diagram of one embodiment of an embedded threat data recorder as contemplated by the invention is shown. The embedded threat data recorder 200 includes first, second and third data correlators 202, 204 and 206, cross correlator 208, threat data base processor 210, data transfer system 222 (DTS), display processor 220, short form display 228 and long form display 230. Optionally, a data link protocol 280 and off-line analysis function 226 may be included in the embedded threat data recorder system. A control apparatus 236 controls the flow of data from various ASE sensors in a well known manner, such as by employing a state machine or another data flow scheme. If, for example, a state machine is used, data ready and data valid signals from the various ASE sensors are transmitted to the control apparatus which then responds by actuating any or all switches such as S1, S2, S3, S4 and S5. The embedded threat data recorder 200 uses data from an apparatus for generating platform related data 232.

The processor 210 further includes an apparatus for computing the dynamics of threat parameters, a formatting/data compression and packing threat data apparatus 214, a memory mapping apparatus 216 and a threat data base 218. The data transfer system 222 further includes a data transfer cartridge 224 (DTC). Such data transfer cartridges are well known in the art.

In operation, the embedded threat data recorder 200 receives data from the various ASE sensors including the pulsed radar jammer, radar warning receiver (RWR), CW radar jammer, the missile approach detector and platform related data. In operation, this data may be transmitted to the embedded threat data recorder on the data bus 44. For the purposes of explaining the functional diagram of FIG. 6, the pulsed radar jammer threat data is shown as being transmitted on line 234, the RWR threat data is shown as being transmitted on line 240, the CW radar jammer threat data is shown as being transmitted on line 242, and the missile approach detector data is shown as being transmitted on line 244. It is understood that the data flow lines 234, 240, 242, 244 and the other data flow lines shown in FIG. 6 represent combinations of communication lines within the bus 44 and the various bus connections between the ASE sensors as shown in FIGS. 1 and 2.

The apparatus for generating platform related data 232 receives aircraft positioning (GPS) data on line 246, inertial navigation system (INS) data on line 248, altitude data on line 251, and mission time data on line 250. The apparatus for generating platform related data 232 uses the GPS data, INS data and mission time to provide dynamic data to the processor 210 on data flow line 252. This dynamic data may include mission time, heading, altitude, and position of the aircraft at the time which a threat is first detected. These parameters are readily generated from the GPS, INS and mission time data in a well-known manner.

The missile approach detector data on data flow line 244 is provided to processor 210 directly. The pulsed radar jammer threat data provided on line 234, the RWR threat data provided on line 240, and the CW radar jammer threat data provided on line 242 are correlated in data correlators 202, 204 and 206 respectively. The data correlators 202, 204 and 206 implement a temporal data correlation method. In general, the threat data generated from the same sensor, but in different time frames, is correlated to provide threat status by identifying old and new threats. The processor 210 is the output of the data correlators to determine which threat data must be recorded. For example, an old threat may not be recorded since it has already been previously recorded by the embedded threat data recorder in order to save memory and time.

Example:

| Correlate Threat Data of The Pulsed Radar Jammer Provided At Two Different Time Frames | |
|---|---|
| Radar Threat List ($T_i$) | Radar Threat List ($T_{i+1}$) |
| T_a(a1, a2, a3, . . .) | T_a(a1, a2, a3, . . .) |
| T_b(b1, b2, b3, . . .) | T_c(c1, c2, c3, . . .) |
| T_c(c1, c2, c3, . . .) | T_e(e1, e2, e3, . . .) |
| T_d(d1, d2, d3, . . .) | Correlated Threat List |
| | T_a(a1, a2, a3, ,old) |
| | T_c(c1, c2, c3, ,old) |
| | T_e(e1, e2, e3, ,new) |

Data correlator 202 provides uncorrelated data on data flow line 266 to the processor 210. Similarly, data correlator 206 provides uncorrelated data from the CW radar jammer threat data sensor on line 258 to processor 210. Cross correlator 208 implements a cross correlation method. The data from the pulsed radar jammer, RWR and CW radar jammer are correlated in order to remove duplicated threats and to include jamming status into the radar warning receiver threat data. The cross correlator 208 implements the same basic correlation techniques as explained herein, but here the output is used for different purposes.

The processor 210 receives data flow on lines 266, 256, 258, 244 and 252 as shown. This data is appropriately shared and routed to the apparatus for computing dynamic threat parameters 212, the formatting/data compression and packing threat data apparatus 214, the memory mapping apparatus 216 and the threat data base 218. The apparatus for computing dynamic threat parameters 212 determines the duration of an active threat, the range of the operational frequency of the threat, and the range of the pulse repetition interval (PRI). Such parameters and others, if desired, are computed in a standard well-known manner. For example, in order to determine the duration of an active threat, the apparatus for computing dynamic threat parameters 212 computes the period of time from the first time that the threat is detected as active to the present time, or to the time that the threat is shown as inactive.

The range of operational frequency of a given threat, for example, may be computed by tracking the sampled operational frequency of a threat which is being tracked by one of the sensors at various times during the mission. The apparatus for computing dynamic threat parameters 212 may, for example, keep the highest and lowest samples as a determination of the range, and compute the mean average using standard statistical analysis techniques. This data can then be recorded and used down stream by off-line analysis tools to adapt the ASE system to various threat variations. In such a way, the ASE integrated system can learn the best modes of recognizing and avoiding certain threats. The dynamic threat parameters are then provided on line 213 to the apparatus for formatting/data compression and packing threat data 214. Apparatus 214 reformats and packs data using well-known formatting and packing techniques in order to substantially optimize the use of storage area. The apparatus 214 may advantageously employ a loss-less compression technique as is well known in the art. The compressed and formatted data is provided on line 215 to the memory mapping apparatus 216 and implements a well-known dynamic memory allocation method that provides storing and retrieving capability to the processor from the threat data base. For example, display processor 220 also maps threat data into records and pages for use as it processes threats for display.

The threat data base 218 is organized in many convenient standard formats and includes all applicable data such as identified threats, jammed threats, mission times, threat positions, aircraft position, threat durations, threat modes, the source of threat identification, AOA, and any other threat-related parameters which one may desire to include in the data base. Information from the data base 218 may be read out into the data link protocol 280, the display processor 220, and the data transfer system 222 on line 268.

The display processor 220 processes threats for display by processing data from the threat data base in a well-known manner for display on well-known display systems. Threat data may be advantageously represented in two different forms, a long form and a short form. In the long form, a complete set of threat parameters is displayed. In the short form, a sub-list of parameters is displayed. Examples of the long and short form are shown here and on FIG. 7 which is described further in detail hereinbelow.

The data link protocol 280 optionally provides a means for transmitting threat data base information from the aircraft carrying the embedded threat data recorder to, for example, other aircraft, a satellite link or a ground base station. The data link protocol may be any conventional data link protocol.

The data transfer system 222 which includes the data transfer cartridge 224 also receives information from the threat data base. Data recorded on the data transfer cartridge may be down-loaded for off-line analysis using conventional techniques as indicated by flow line 274 into off-line analysis function 226. The off-line analysis techniques may be any type of analysis that is helpful to improve the system as may be readily discerned by those skilled in the art.

Figure 7:
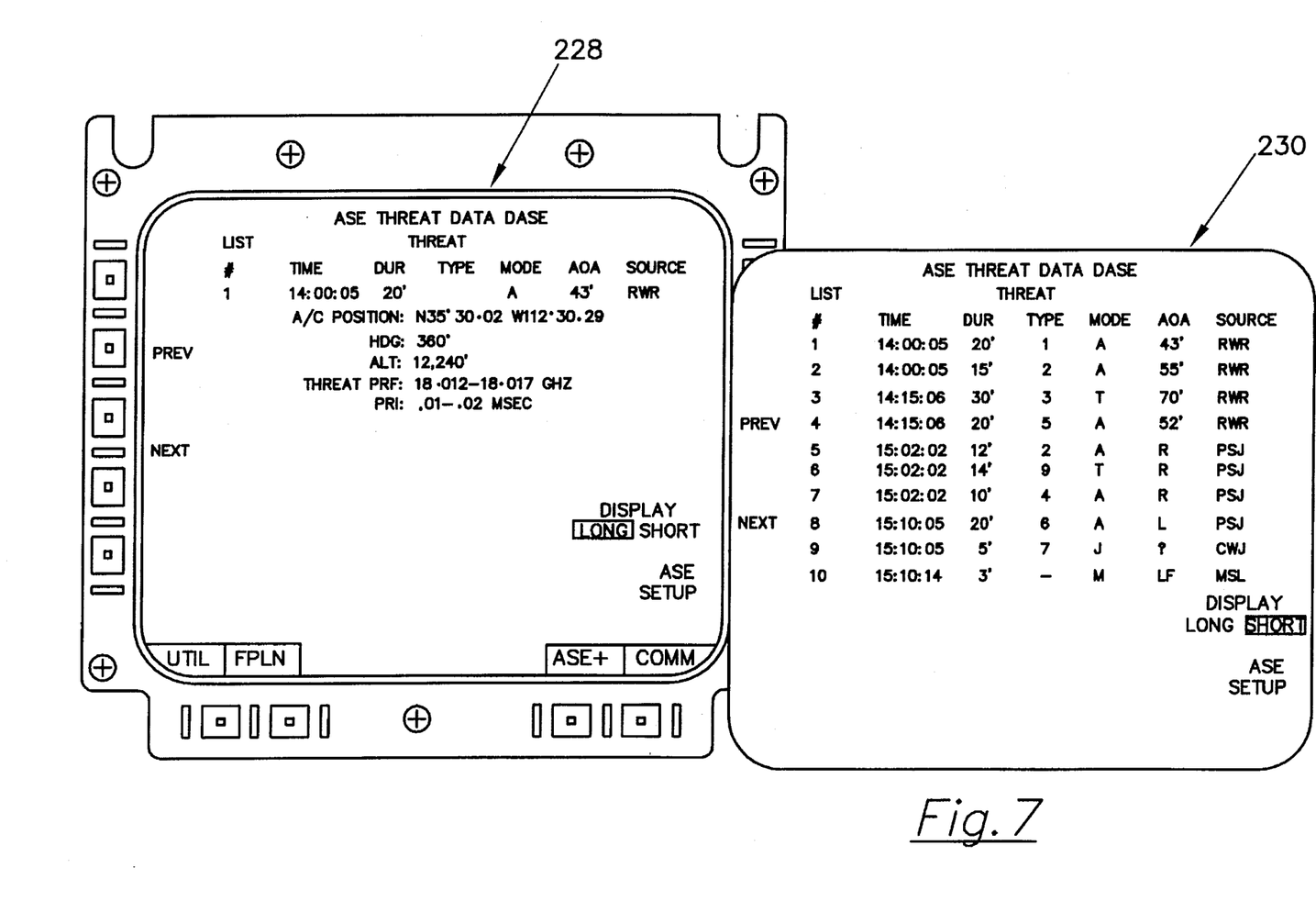
FIG. 7 shows a schematic diagram of a long form and a short form multifunction display page.

Referring now to FIG. 7, examples of a short form display 228 and long form display 230 are shown. The type of display used is selected by the ASE operator as the case may be. The long form display 230 shows more detailed information for a given threat. The short form display 228 shows all detected threats 1–10. The threats are shown with abbreviated information on each threat.

The manage threat event data base method of the invention is executed by the processor 210 and records the emitter activity being received and jammed by the IASE suite and allows the operator to replay the recorded events, either on or off the aircraft, and provides more complete and accurate Electronic Order of Battle reporting during the post-mission debrief. This method consists of two primary functions, record and replay. The record function monitors the ASE threat emitter reports, extracts appropriate threat parameters, and stores data into non-volatile memory. The replay function provides the recorded data to the operator in a format that supports both on-aircraft and off-aircraft needs.

The record function stores data that optimizes threat situation and ASE status information so that the amount of physical memory that is required to store the data is minimized. Those skilled in the art will recognize that the use of a mass storage device, such as an optical disk on-aircraft, will alleviate this consideration.

Three types of data are of interest and may be advantageously recorded: threat emitter parameters, ASE status indications and mission variables.

Threat emitter parameters include information that is provided from each of the ASE subsystems threat emitter reports. Data parameters include frequency, pulse width, pulsed repetition interval and angle of arrival. The result of the correlation method, the IASE system threat list, is used to provide this data to ensure that threats are correlated and the maximum amount of data is provided to the record function.

ASE status indications include information about the operation of the ASE subsystems. Data concerning jamming status, recognition ambiguities, and display anomalies are also recorded.

Mission variables include threat and ASE data that is recorded with a time tag to allow the data to be recreated in chronological order. GPS time which has already been used in the IASE system is used for this time tag. It is desirable to store a position tag with each significant threat event. Storing aircraft position with each threat detection report may be useful during the post-flight debrief.

Replay Threat Data is an initial replay capability that must provide the operator with a list of significant threat events that occurred during a mission. Minimum data requirements include: threat type, threat mode, and angle or direction of arrival. The operator should be able to access the recorded threat list on-aircraft via the Aircraft Survivability Equipment/Avionics Control System (ASE/ACS) and to download the threat list to a Data Transfer Cartridge for transportation to a Mission Planning/Replay Station.

An alternate replay capability allows the operator to record and play back a time segment of the threat situation display in the aircraft. A display capability may be provided that allows the operator to use the ASE/ACS to control an embedded Video Cassette Recorder (VCR) which records the threat situation display. Information could be recorded for a period of time stretching from minutes up to an hour depending on the density of the threat environment and the amount of information that is stored on each threat emitter.

Recording a segment of the threat situation display may be particularly useful for a rotary wing application. In this case the aircraft can pop-up to observe an area of interest, record the threat situation for the required period of time, and then return to a masked position. Then the operator can replay and analyze the threat situation prior to continuing on in the mission, such as making a final approach on a target or flying unmasked for a long period of time. Threat situation information can also be down-loaded to a Data Transfer Cartridge for use on a ground-based Mission Planning Station after the mission.

The manage threat event data base process provides the capability to record threat events encountered during a mission. Potential sources of threat data are the Radar Warning Receiver, Pulsed Jammer Receiver, CW Jammer Receiver, and the Missile Approach Detector. Threat data is time tagged to differentiate between new and existing threat detections from a specific sensor before recording. Each threat event is stored in a record format containing a set of descriptive parameters and may be accessed by the crew on a defined MFD page. This process will also provide for the down-load of the recorded threat event database to the DTS.

Inputs include:

Radar_Warning_Receiver_Threat_Data

Pulsed_Radar_Jammer_Threat_Data

CW_Radar_Jammer_Threat_Data

Missile_Approach_Detector_Threat_Data

GPS_Current_Time

GPS_Position

Altitude

Time tagged threat events and selected threat data are combined with mission time and the aircraft's position data for recording. The data associated with the threat events is processed in the following order of the subsystems: Missile Approach Detector, 2) Radar Warning Receiver, 3) Pulsed Radar Jammer, and 4) CW Radar Jammer. A threat event occurs when one of the following conditions is true:

CONDITION 1: the Radar Warning Receiver detects a new threat including the case where an old threat changes the operational mode; or CONDITION 2: the Pulsed Radar Jammer or the CW Radar Jammer has began to jam a threat; or CONDITION 3: the Missile Approach Detector has detected an incoming missile.

A temporal data correlation method processes threat data frames received from a subsystem, compares the threat data frames to previous data frames to distinguish new threats from existing threats, and identifies threats which are no longer being tracked, or threats which have operational mode changes.

The recording threat events process records threat events. Threat events are recorded in the order defined for subsystems and the priority is from high to low with respect to each subsystem. Each threat event is stored in an individual record comprised of the following parameters: sequence number, detection duration, emitter identification, threat mode, threat status, angle or direction of arrival, subsystem data source, time of day, aircraft position and altitude.

In one example, specific definitions of the threat event parameters recorded within each record are as follows: a) "Event Sequence" is the order of event processing; b) "Time" is the initial time of a new threat detection for the Radar Warning Receiver and the initiation of threat jamming for the jammers; c) "Duration" is the elapsed time from the initial detection of a new threat to the time when threat aged-out begins for the Radar Warning Receiver or the time span of jamming a particular threat for the jammers; d) "Emitter Identification" is a unique number assigned by the source subsystem; e) "Threat Mode" is the detected radar mode; f) "Threat Status" is the indication of threat ambiguity or jamming activity; f) "Angle of Arrival" is the relative bearing to the threat referenced to the aircraft heading; g) "Data Source" indicates the subsystem providing the threat data; and h) "Position" is the aircraft position at the time a threat event is detected.

If the data of any defined parameter is not available, a null value (0) is stored for that parameter and a '?' symbol is displayed.

If the Radar Warning Receiver is a part of the ASE suite and operational then threat data provided by the subsystem is processed to determine threat events based on condition (1) stated above. Once a threat event is determined, the process will store all the data associated with that threat event. Otherwise, if the ASE_System_State is set equal to a value outside a predetermined range the Radar Warning Receiver is considered as being inoperative and no event data is recorded.

If the Pulsed Radar Jammer is a part of the ASE suite and operational then the threat data provided by the subsystem is processed to determine threat events based on condition 2 stated above. Once a threat event is determined, the process will store all the data associated with that threat event. Otherwise, if the ASE_System_State is set equal to a value outside the defined range, then the Pulsed Radar Jammer is considered inoperative and no event data is recorded.

If the CW Radar Jammer is a part of the ASE suite and operational then the threat data provided by the subsystem is processed to determine the threat event based on condition 2 stated above. Once a threat event is determined, the process will store all the data associated with the threat event. Otherwise, if the ASE_System_State is set equal to a value outside the defined range, then the subsystem is considered inoperative and no event data is recorded.

If the Missile Approach Detector is a part of the ASE suite and operational then the data provided by the subsystem is processed to determine threat event based on the condition 3 stated above. Once the threat event is determined, the process will store all the associated with the threat event. In lieu of the angle of arrival data the incoming missile quadrant is recorded. If ASE_System_State is not equal to a value of the defined set, then the Missile Approach Detector is considered as inoperative and no data is recorded.

Threat event data recorded from various ASE subsystems is processed for display on the ASE Threat Events page. On this page, basic data such as time of detection, duration, threat type, threat mode, angle of arrival, and data source is presented in the display format as depicted in FIG. 7.

The system outputs include::

Radar_Warning_Receiver_Threat_Event_Data

Pulsed_Radar_Jammer_Threat_Event_Data

CW_Radar_Jammer_Threat_Event_Data

Missile_Approach_Detector_Threat_Event_Data

Figure 3:
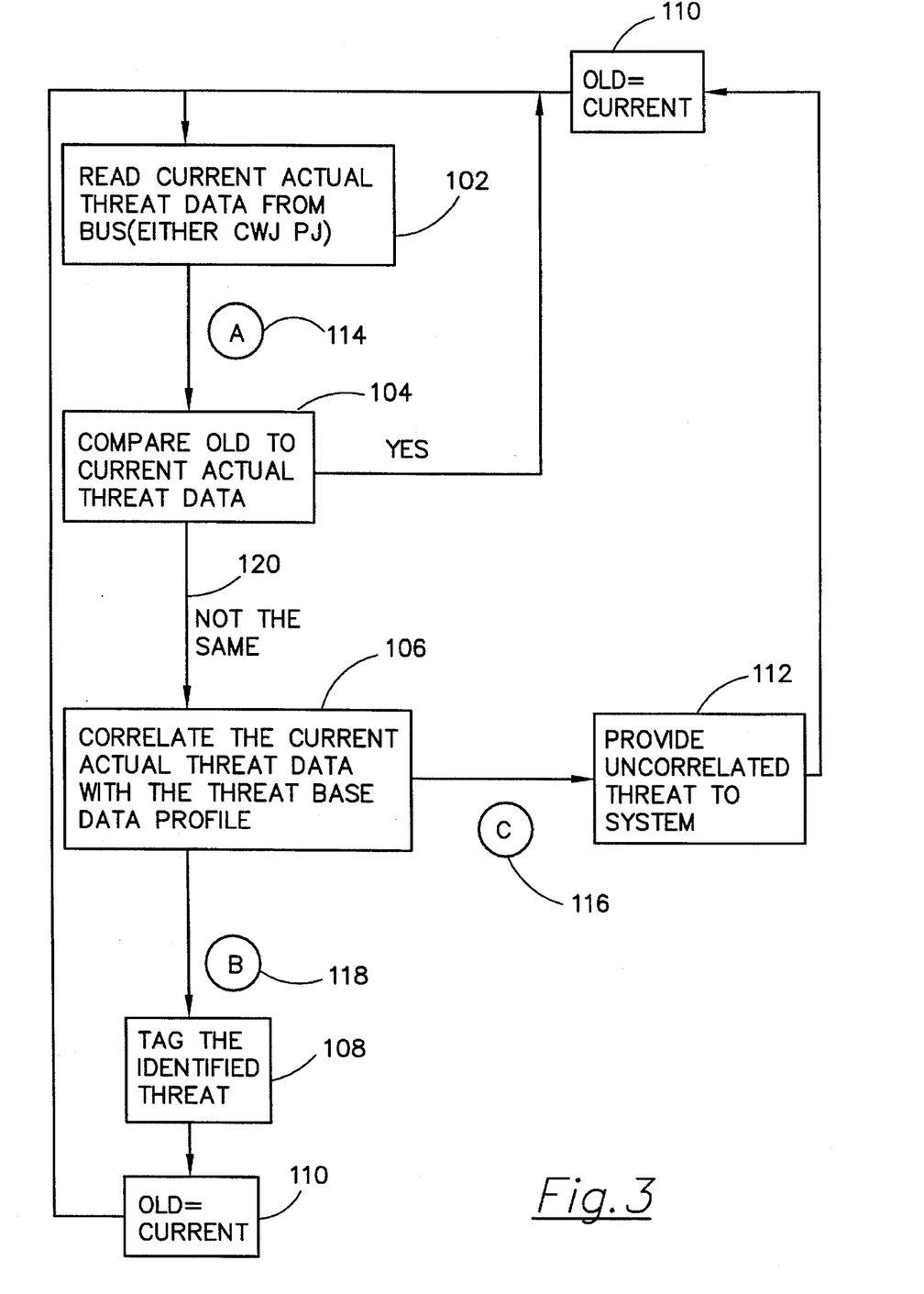
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer or the pulsed radar jammer to either an un-correlated threat or an identified threat. The threat data base is composed of a number of sub-elements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the ASE sensors. Each threat type has an associated set of parameters which, in one preferred embodiment of the invention, include frequency of the threat signal, amplitude of the threat signal, pulse repetition frequency, pulse repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwire connections, line 58 and line 60, and from the radar jammers 34, 36. Those skilled in the art will recognize that the bus method of communication provides more threat information. The process flows to process step 104 where previously received old threat data is compared to just received current actual threat data. Step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 114 designated as data set A.

Figure 5:
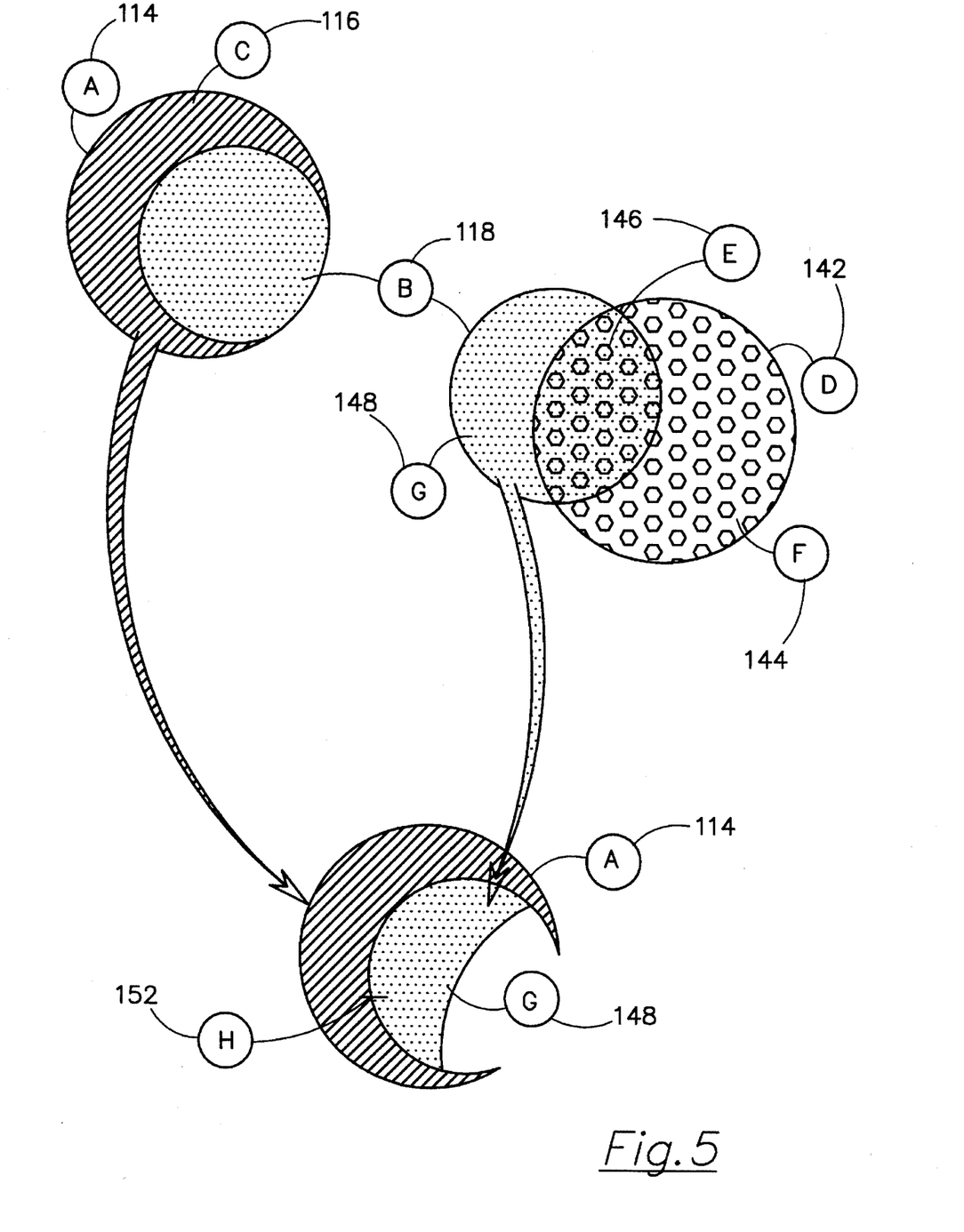
FIG. 5 shows a data flow diagram showing the various data sets of the invention in a Venn diagram fashion.

The method of the invention the processor creates different sets of data which are correlated as shown in FIG. 5 which is described in detail below. At step 102, the process takes data from one of the radar jammers which is designated as data set A 114. In step 106, a data set labeled C 116 is generated which represents an un-correlated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process step 104 the comparison to check old threat data against current threat data results in the old and the current being the same, then the process flows to step 102 to read the next current actual threat data from the bus or from the hardwired system.

Figure 4:
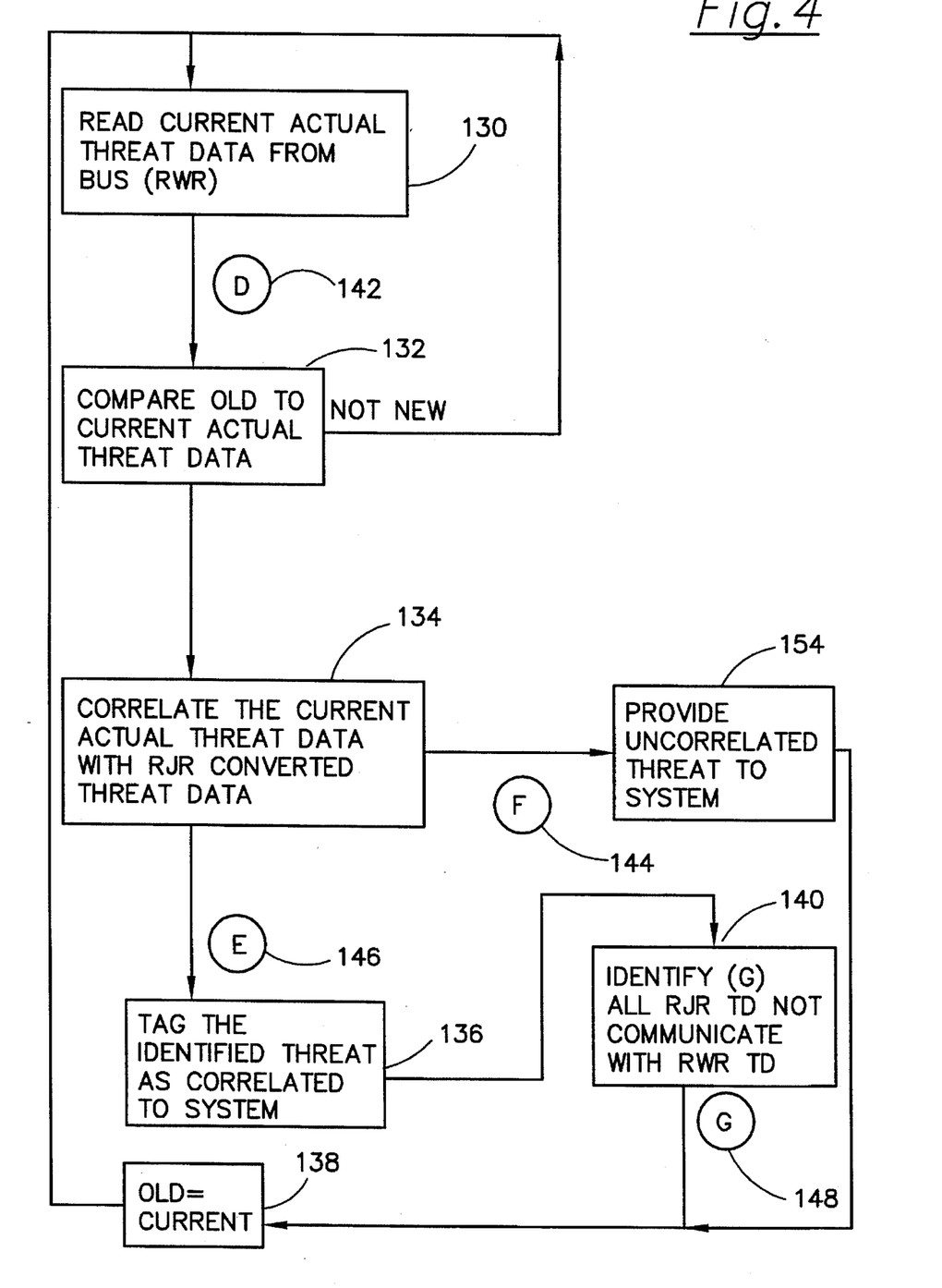
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. The process step 130 generates data set D. Data set D is then used by process step 132 to compare the current actual threat data with old threat data from the radar warning receiver. If the two threats are identical (i.e. the old and the current in step 132), the process returns to step 130 to read another actual threat. Step 103 reads in all available threats from the radar warning receiver. The set of all possible threats is commonly known as a threat set. In step 132, the old threat set is compared against a current actual threat set data. If the current actual threat set data is not a new threat set, then the process flows to step 130 to scan another set of threats. In step 132, if there is a new threat, the process flows to step 134 to correlate the current actual threat set with the radar jamming receiver conferred at threat data which is generated in FIG. 3. The threat data is indicated by set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to step 130 to read the next current actual threat data set from the bus.

If in step 134 there is no correlation between the current actual threat data set with the radar jamming receiver converted threat data set, the process flows to step 154, generates an un-correlated threat set F 144, and provides the un-correlated threat set to the system using the method of the invention.

As is the case with the jammer data, when implementing the method of the invention to convert the current actual threat data set from the radar warning receiver to either a correlated or un-correlated threat, the process creates various other data sets. Data set D 142 is the current active threat data set from the bus. Data set E 146 is the correlated current actual threat data with the radar jamming receiver converted threat data. Data set F 144 is the un-correlated data. Data set G is the data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 142 is current actual radar warning receiver threat data. Data set E 146 is the common current threat data. Data set F 144 is the un-correlated radar warning receiver threat data. Data set G 148 is the radar jamming receiver threat data which is not common with the radar warning receiver threat data. Data set G is used subsequently to generate a complementary threat set H 152. Data set H 152 is the complimentary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complimentary threat. The data set B 118 is subtracted from data set A 114 to generate data set C 116 which is the un-correlated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H which is called the complementary threat data.

The complementary threat data set H comprises threats that are complementary to the already identified threats which have been identified by the radar warning receiver.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An embedded threat data recorder and in-flight playback apparatus for an aircraft survivability equipment system, said apparatus comprising:

(a) at least one aircraft survivability equipment sensor having at least one sensor output for producing a sensor output signal in response to a current threat;

(b) correlation means attached to the at least one aircraft survivability sensor, said means for receiving the sensor output signal and determining if the current threat is a new threat or an old threat, the correlation means having a correlation output for producing a correlation signal indicative of whether the threat is old or new; and (c) data recorder and in-flight playback means having an input connected to the correlation output for recording information and playing it back upon pilot demand.

2. The apparatus of claim 1 wherein the at least one aircraft survivability sensor includes a radar warning receiver means and a radar jamming means.

3. The apparatus of claim 2 wherein said radar warning receiver means comprises means for generating radar warning receiver threat data and said radar jamming means comprises means for generating radar jammer threat data, said apparatus further comprising means for cross-correlation connected to receive the radar warning receiver threat data and the radar jammer threat data.

4. The apparatus of claim 1 further comprising a multifunction display.

5. The apparatus of claim 4 further comprising means for displaying the threat data on said multifunction display.

6. The apparatus of claim 4 further comprising means for displaying mission data on said multifunction display for threat situation assessment, mission briefing, evaluating countermeasures effectiveness, and identifying new threats.

7. The apparatus of claim 5 wherein said threat data displaying means comprises means for displaying threat data on said multifunction display in a long form for displaying all threat information and a short form for displaying abbreviated threat information.

8. The apparatus of claim 1 further comprising means for downloading data into a data transfer cartridge.

9. The apparatus of claim 8 further comprising means for utilizing said data transfer cartridge for off-line threat analysis.

10. An embedded threat data recorder apparatus comprising:

(a) first input means for receiving pulsed radar jammer data, said first input means comprising a first switch having open and closed positions;

(b) means for generating platform related data adapted to receive global positioning system (GPS) data, mission time and altitude data, so as to generate the platform related data responsively to the GPS, mission time and altitude data;

(c) means for switching through a plurality of signals including a pulsed radar jammer data signal, a radar warning receiver threat data signal, a continuous wave radar jammer threat data signal, a missile approach detector threat data signal and the generated platform related data;

(d) control means connected for controlling the first switch by providing a control signal for opening and closing the switch;

(e) first data correlation means connected to the switching means to receive the pulsed radar jammer threat data signal, said first data correlation means comprising a first correlated output and a first uncorrelated output; (f) second data correlator for correlating radar warning receiver threat data connected to said switching means to receive, as controlled by said control apparatus, the radar warning receiver threat data signal, said second data correlator comprising a correlated output;

(g) third data correlation means connected to said switching means to receive the continuous wave radar jammer threat data, said third data correlation means having a third correlated output and a second uncorrelated output;

(h) a cross correlator connected to said first, second and third correlated outputs and having a cross correlated output;

(i) means for threat data recording connected to receive the first and third uncorrelated outputs, the cross correlated output, the missile approach detector threat data signal, a signal switched through said switching means and the platform data as switched through said switching means, said threat data recording means having a display output and a recorded data output;

(j) means for processing the threat displays having an input connected to the display output; and (k) a data transfer system having an input connected to the data recording output and having an off-line analysis output.

11. The apparatus of claim 10 wherein said means for threat data recording further comprises means for computing dynamic threat parameters responsive to the outputs received by said threat data recorder.

12. The apparatus of claim 10 further comprising formatting and data compression packing means for formatting and data compression of the outputs received by said threat data recorder.

13. The apparatus of claim 10 further comprising memory mapping means for mapping data formatted and compressed by said data compression and packing means.

14. The apparatus of claim 10 wherein said means for processing threat displays is capable of showing a short form threat display and a long form threat display.

15. An in-flight threat situation recording system for recording numerous characteristics of a threat situation during flight, the recording system comprising:

a first aircraft survivability equipment sensor having a first aircraft survivability sensor output for producing a first sensor output signal in response to a current threat, the first sensor output signal indicative of the current threat;

a second aircraft survivability equipment sensor having a second aircraft survivability sensor output for producing a second sensor output signal in response to a current threat, the second sensor output signal indicative of the current threat;

threat correlation means for receiving the first sensor output signal and the second sensor output signal and determining whether the current threat is a new threat or an old threat, the threat correlation means having a correlation output for producing a threat correlation signal indicative of whether the threat is old or new; and an in-flight threat data handling apparatus for receiving the threat correlation signal and recording it, the data handling apparatus also for allowing in-flight playback upon demand.

16. The in-flight threat situation recording system of claim 15 further comprising a multifunction display attached to the threat data handling apparatus for displaying the threat correlation signal, the first sensor output signal, and the second sensor output signal.

17. The in-flight threat situation recording system of claim 15 further comprising a transmitting apparatus for transmitting the threat correlation signal, the first sensor output signal, and the second sensor output signal to a satellite, a ground base, or another aircraft survivability system.

18. The in-flight threat situation recording system of claim 15 wherein the first aircraft survivability equipment sensor includes a radar warning receiver and the second aircraft survivability sensor is a radar jammer.

19. The in-flight threat situation recording system of claim 18 wherein the threat correlation system receives inputs from the radar warning receiver and the radar jammer, and produces the threat correlation output based upon the received inputs.

20. The in-flight threat situation recording system of claim 19 wherein the in-flight threat data handling apparatus receives inputs from the radar warning receiver and the radar jammer and records these signals in conjunction with the threat correlation signal for each current threat.

21. The in-flight threat situation recording system of claim 15 wherein the in-flight threat data handling apparatus is further capable of retrieving the correlation signal, the first sensor output signal and the second sensor output signal from previous readings generated by a previous threat.

* * * * *